United States Patent
Black et al.

(10) Patent No.: US 9,471,532 B2
(45) Date of Patent: Oct. 18, 2016

(54) REMOTE CORE OPERATIONS IN A MULTI-CORE COMPUTER

(75) Inventors: Richard John Black, Cambridge (GB); Timothy Harris, Cambridge (GB); Ross Cameron McIlroy, Cambridge (GB); Karin Strauss, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1017 days.

(21) Appl. No.: 13/025,446

(22) Filed: Feb. 11, 2011

(65) Prior Publication Data
US 2012/0210071 A1 Aug. 16, 2012

(51) Int. Cl.
*G06F 12/00* (2006.01)
*G06F 15/167* (2006.01)
*G06F 12/08* (2016.01)

(52) U.S. Cl.
CPC ......... *G06F 15/167* (2013.01); *G06F 12/0802* (2013.01); *G06F 12/084* (2013.01); *G06F 12/0811* (2013.01); *G06F 12/0842* (2013.01); *G06F 12/0866* (2013.01)

(58) Field of Classification Search
CPC ........... G06F 12/0802; G06F 12/0811; G06F 12/084; G06F 12/0842; G06F 12/0866; G06F 15/167
See application file for complete search history.

(56) References Cited

U.S. PATENT DOCUMENTS

| 7,263,598 B2 | 8/2007 | Ambuel |
| 7,320,056 B2 | 1/2008 | Shimada et al. |
| 2005/0278483 A1* | 12/2005 | Andruszkiewicz et al. .. 711/114 |
| 2006/0075197 A1 | 4/2006 | Shimada et al. |
| 2006/0080513 A1 | 4/2006 | Beukema et al. |
| 2006/0107098 A1* | 5/2006 | Maki et al. ...................... 714/6 |

(Continued)

FOREIGN PATENT DOCUMENTS

| CN | 101430651 A | 5/2009 |
| CN | 101510191 A | 8/2009 |

(Continued)

OTHER PUBLICATIONS

Baumann, et al., "The Multikernel: A New OS Architecture for Scalable Multicore Systems", retrieved on Jan. 12, 2011 at <<http://www.cs.brown.edu/courses/csci2750/p29-baumann.pdf>>, ACM, Symposium on Operating Systems Principles (SOSP), Big Sky, Montana, Oct. 2009, pp. 29-43.

(Continued)

*Primary Examiner* — Aracelis Ruiz
(74) *Attorney, Agent, or Firm* — Tom Wong; Micky Minhas; Zete Law, P.L.L.C.

(57) ABSTRACT

A multi-core processor with a shared physical memory is described. In an embodiment a sending core sends a memory write request to a destination core so that the request may be acted upon by the destination core as if it originated from the destination core. In an example, a data structure is configured in the shared physical memory and mapped to be accessible to the sending and destination cores. In an example, the shared data structure is used as a message channel between the sending and destination cores to carry data using the memory write request. In an embodiment a notification mechanism is enabled using the shared physical memory in order to notify the destination core of events by updating a notification data structure. In an example, the notification mechanism triggers a notification process at the destination core to inform a receiving process of a notification.

20 Claims, 13 Drawing Sheets

(56) References Cited

U.S. PATENT DOCUMENTS

2006/0259705 A1    11/2006    Cousin et al.
2008/0091884 A1     4/2008    Piry et al.
2008/0244231 A1    10/2008    Kunze et al.

FOREIGN PATENT DOCUMENTS

| CN | 101477511 B | 8/2010 |
| --- | --- | --- |
| TW | 389858 B | 5/2000 |
| TW | 567413 B | 12/2003 |
| TW | I283348 B | 7/2007 |

OTHER PUBLICATIONS

Black, et al., "Barrelfish: A Multikernel for multicore", retrieved on Jan. 12, 2011 at <<http://download.intel.com/corporate/education/emea/event/irc/files/presentations/deu/T1_RichardBlack.pdf>>, Microsoft Corporation, Sep. 22, 2010, pp. 1-51.

Bracy, et al., "Disintermediated Active Communication", IEEE Computer Architecture Letters, vol. 5, 2006, pp. 1-4.

Chatterjee, et al., "Optimizing a Multi-Core Processor for Message-Passing Workloads", retrieved on Jan. 12, 2011 at <<http://ispass.org/ucas5/session3_2_utah.pdf>>, Workshop on Unique Chips and Systems (UCAS), Boston, Massachusetts, Apr. 2009, pp. 1-8.

Fensch, et al., "An OS-Based Alternative to Full Hardware Coherence on Tiled CMPs", IEEE Proceedings of Symposium on High-Performance Computer Architecture, 2008. pp. 355-366.

Hayter, "A Workstation Architecture to Support Multimedia", St John's College, University of Cambridge, PhD Dissertation, Sep. 1993, pp. 1-111.

Kumar, et al., "Carbon: Architectural Support for Fine-Grained Parallelism on Chip Multiprocessors", ACM, Proceedings of Intl Symposium on Computer Architecture (ISCA), San Diego, California, Jun. 2007, pp. 162-173.

Pugsley, et al., "SWEL: Hardware Cache Coherence Protocols to Map Shared Data onto Shared Caches", retrieved on Jan. 12, 2011 at <<http://www.cs.utah.edu/~rajeev/pubs/pact10p.pdf>>, ACM, Intl Conference on Parallel Architectures and Compilation Techniques (PACT), Vienna, Austria, Sep. 2010, pp. 1-11.

Sanchez, et al., "Flexible Architectural Support for Fine-Grain Scheduling", retrieved on Jan. 12, 2011 at <<http://csl.stanford.edu/~christos/publications/2010.adm.asplos.pdf>>, ACM, Proceedings of Intl Conference on Architectural Support for Programming Languages and Operating Systems (ASPLOS), Pittsburgh, Pennsylvania, Mar. 2010, pp. 311-322.

Stromblad, "The Future Multicore OS: Future Challenges for Embedded Operating Systems and Applications", retrieved on Jan. 12, 2011 at <<www.sics.se/files/Enea_MC_day.pdf>>, ENEA at Swedish Institute of Computer Science (SICS), 2008, pp. 1-30.

von Eicken, et al., "Active Messages: a Mechanism for Integrated Communication and Computation", ACM, Proceedings of Intl Symposium on Computer Architecture (ISCA), 1992, pp. 430-440.

"Fourth Office Action Issued in Chinese Patent Application No. 201210030338.2", Mailed Date: Apr. 27, 2015, 7 Pages.

"First Office Action and Search Report Issued in Chinese Patent Application No. 201210030338.2", Mailed Date: Dec. 25, 2013, 12 Pages.

"Office Action Issued in Chinese Patent Application No. 201210030338.2", Mailed Date: Sep. 2, 2014, 15 Pages.

"Notice of Allowance Issued in Taiwan Patent Application No. 101101125", Mailed Date: Oct. 14, 2014, 6 Pages.

International Search Report and the Written Opinion of the International Searching Authority dated Aug. 29, 2012 for International Application No. PCT/US2012/024776, 9 pages.

"Third Office Action Received for Chinese Patent Application No. 201210030338.2", Mailed Date: Dec. 11, 2014, 6 Pages.

* cited by examiner

REMOTE CORE OPERATIONS IN A MULTI-CORE COMPUTER

BACKGROUND

Multi-core processors are increasingly widespread and are used in many application domains to give performance gains where software processes are parallelized so that they run on multiple cores simultaneously. Each core may be thought of as part of a processor that performs reading and executing of instructions; for example, each core may be a central processing unit (CPU) within a single computing system. Generally speaking, single-core processors are able to process only one sequence of instructions at a time. A multi-core processor has two or more independent cores which may be provided in a single physical device such as a chip or chip package. The multiple cores may or may not have access to a shared physical memory although the present application is concerned with multi-core processors which do have a shared physical memory.

A shared physical memory or memories may be used to enable communication between the multiple cores and may be a block of random access memory (RAM) or other suitable memory. A hierarchy of caches is typically provided to speed up memory accesses from the cores to the memory. The cores, caches, and memory are typically connected to each other by use of an interconnect device. However, use of a shared physical memory in this way brings technical hurdles. For example, coherency between the various caches is typically maintained using a cache coherence protocol. However, cache coherency mechanisms are computationally expensive and use valuable interconnect resources.

The embodiments described below are not limited to implementations which solve any or all of the disadvantages of known multi-core processors which use shared physical memory.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

A multi-core processor with a shared physical memory is described. In an embodiment a sending core sends a memory write request to a destination core so that the request may be acted upon by the destination core as if it originated from the destination core. In an example, a data structure is configured in the shared physical memory and mapped to be accessible to the sending and destination cores. In an example, the shared data structure is used as a message channel between the sending and destination cores to carry data using the memory write request. In an embodiment a notification mechanism is enabled using the shared physical memory in order to notify the destination core of events by updating a notification data structure. In an example, the notification mechanism triggers a notification process at the destination core to inform a receiving process of a notification.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a multi-core computer system with shared physical memory and without cache coherency, the system described is provided as an example and not a limitation. As those skilled in the art will appreciate, the present examples are suitable for application in a variety of different types of multi-core computer systems including those with cache coherency.

Figure 1:
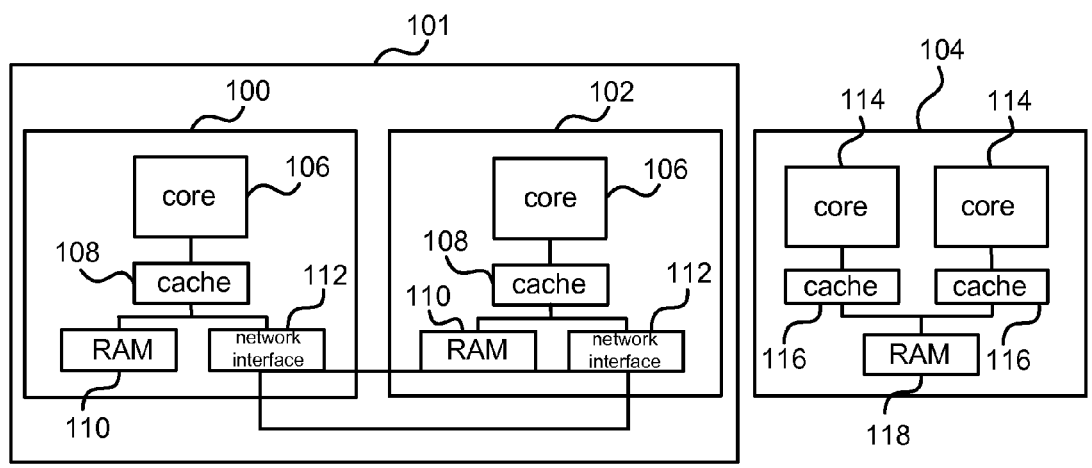
FIG. 1 is a schematic diagram of two multi-core computers, one with shared memory and one without.

FIG. 1 is schematic diagram of two multi-core computers 101, 104, one with shared memory and one without. A first multi-core computer 101 comprises two nodes 100, 102 each having a core 106 with a cache 108. Each node has its own memory 110 and the nodes communicate using a network interface 112 as illustrated. In contrast the embodiments described here use a multi-core computer with shared physical memory such as that illustrated in FIG. 1 as computer 104. Computer 104 has two cores 114 each having a cache 116. The cores share a single physical memory 118 which may be random access memory (RAM) or memory of other suitable type. The cores may be of different types, for example, some may be designed for particular tasks such as graphics processing and others may be designed for general purpose computing.

Writing data into and out of physical memory 118 is time consuming for a variety of reasons. For example, each core 114 may be provided as a chip which is physically located independently of the physical memory 118. In order to enable faster data access each core may have an associated cache 116. Although only one cache per core is illustrated in FIG. 1 in practice there may be a plurality of caches in a hierarchical structure in order to increase the available cache capacity. Using caches enables data access to be speeded up although it also means that in some cases, data accessed from a cache may not be up to date. In order to enable the most up to date data to be used cache coherency mechanisms have previously been used. Cache coherency mechanisms may require significant interconnect resources. In some situations cache coherency mechanisms may use as much as 30% of a multi-core computer's power and interconnect resources.

Figure 2:
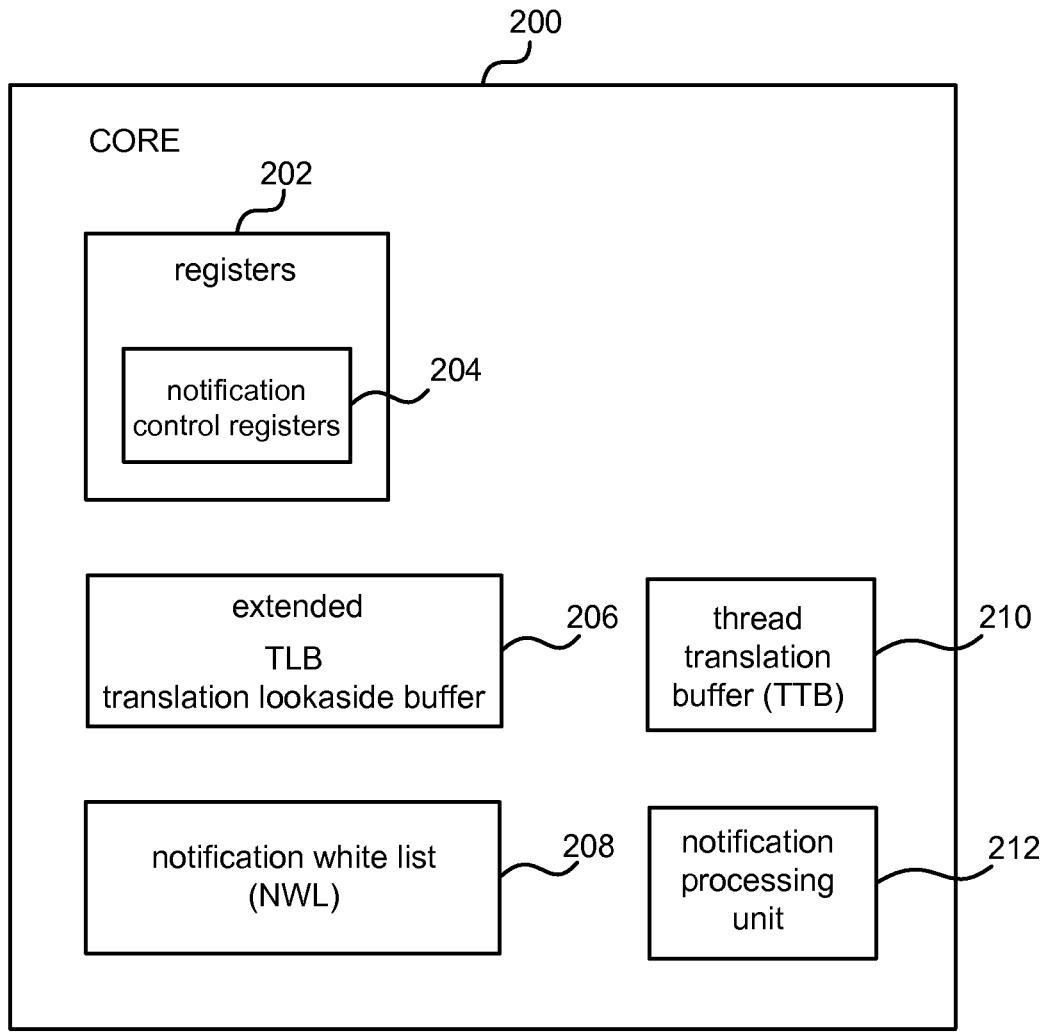
FIG. 2 is a schematic diagram of an example core of a multi-core computer.
Figure 3:
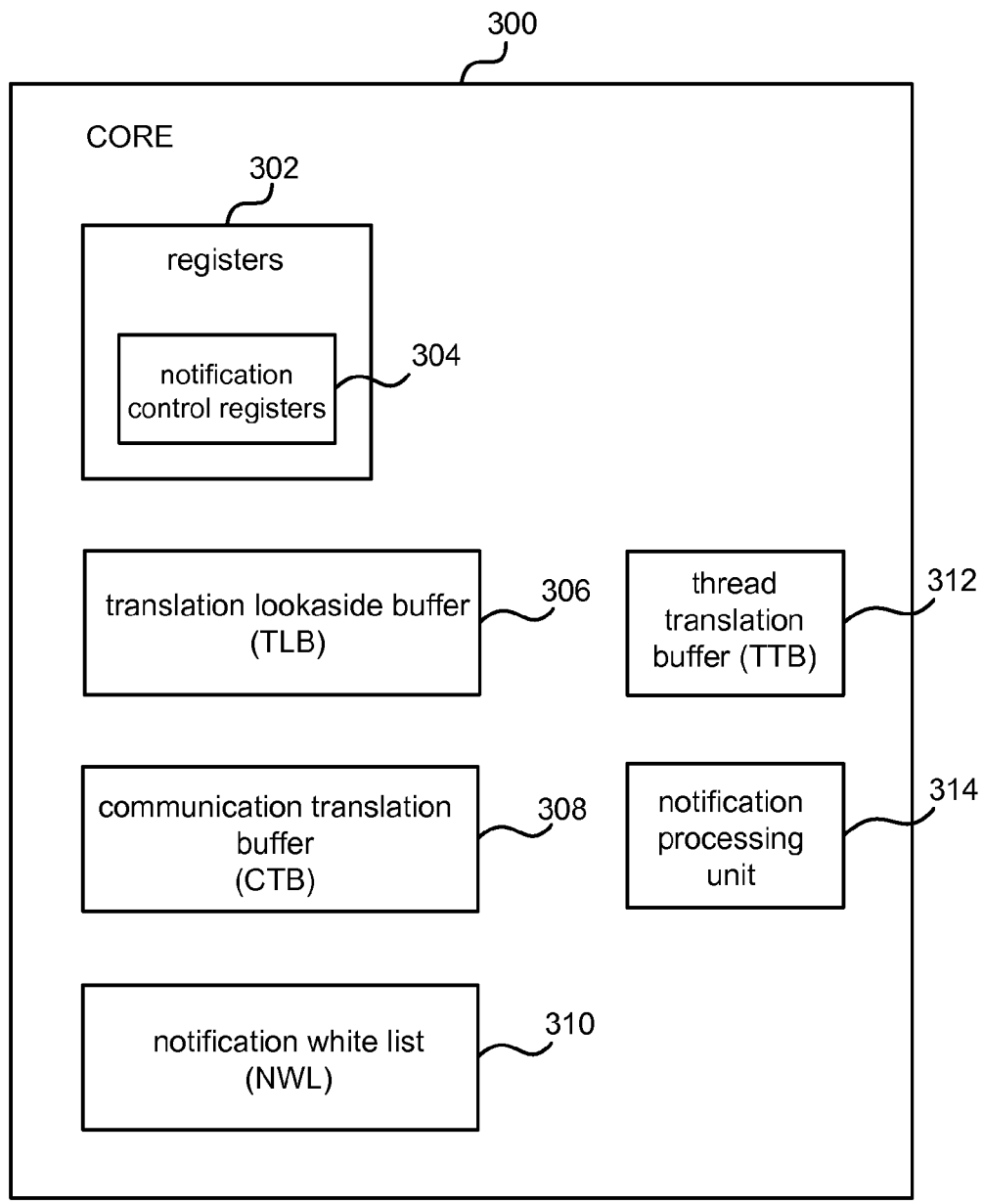
FIG. 3 is a schematic diagram of another example core of a multi-core computer.
Figure 11:
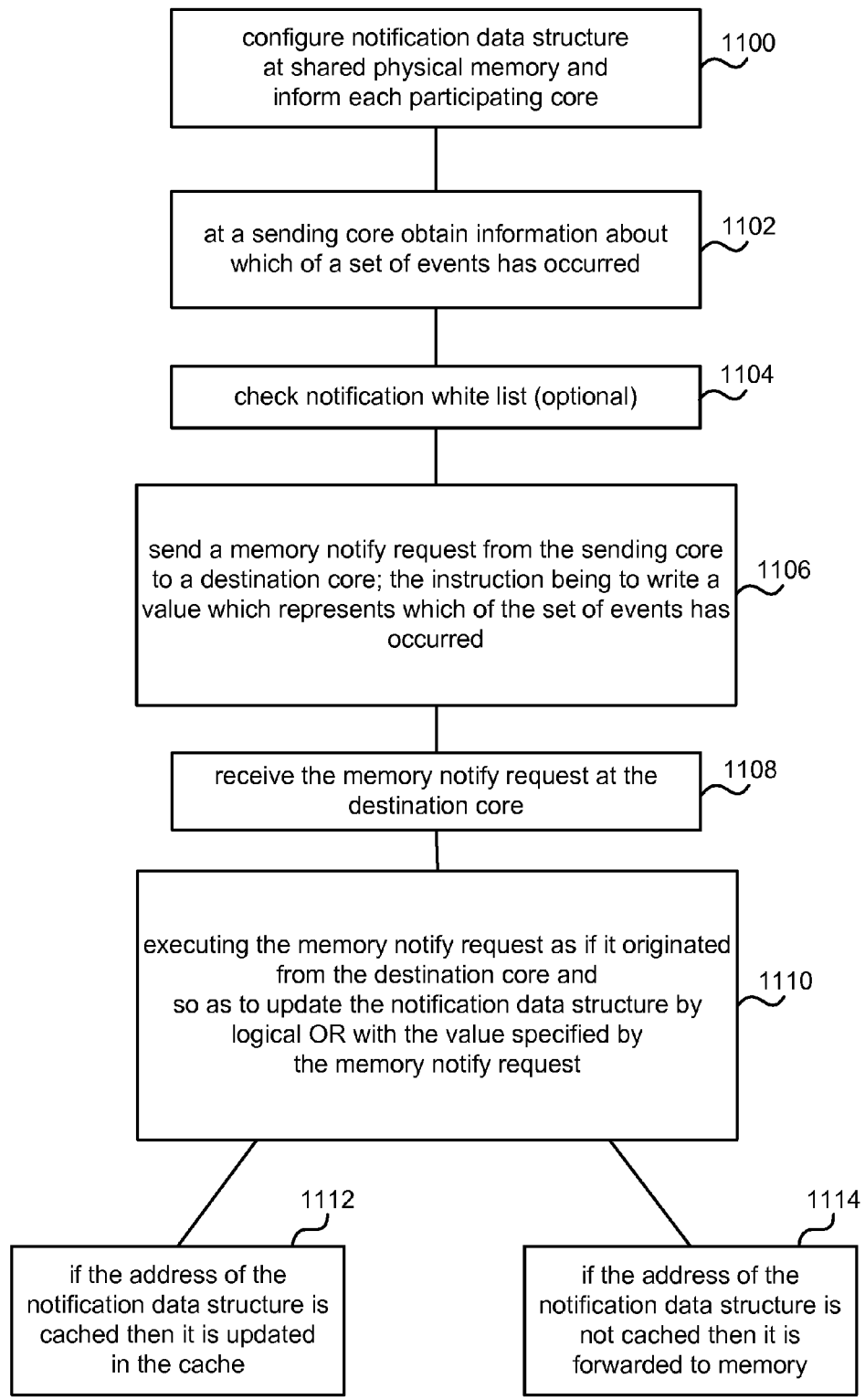
FIG. 11 is a flow diagram of a notification process.

FIG. 2 is a schematic diagram of an example core of a multi-core computer. Many conventional components of a core are not shown for clarity. It comprises one or more registers 202 which comprise a plurality of notification control registers 204 provided to enable implementation of a notification process as described in more detail below with reference to FIGS. 11 and 12. It also comprises an extended translation lookaside buffer 206 (TLB) which is extended to enable implementation of a process for identifying which of a plurality of remote cores is to be a destination core for a send process. Optionally a notification white list (NWL) 208 is provided for use in implementing the notification process in cases where notification is protected. This is described in more detail later in this document. Optionally a thread translation buffer 210 (TTB) is provided and also optionally, a notification processing unit 212. FIG. 3 is a schematic diagram of another example core 300 of a multi-core computer. Many conventional components of a core are not shown for clarity. The core comprises registers 302 which comprise notification control registers 304 in the same manner as described above for FIG. 2. A translation lookaside buffer 306 is provided as well as a separate communication translation buffer (CTB) 308 which is used to enable implementation of a process for identifying which of a plurality of remote cores is to be a destination core for a send process. A notification white list 310 may also be provided as described above with reference to FIG. 2. Optionally a thread translation buffer 312(TTB) is provided and also optionally, a notification processing unit 314.

Figure 4:
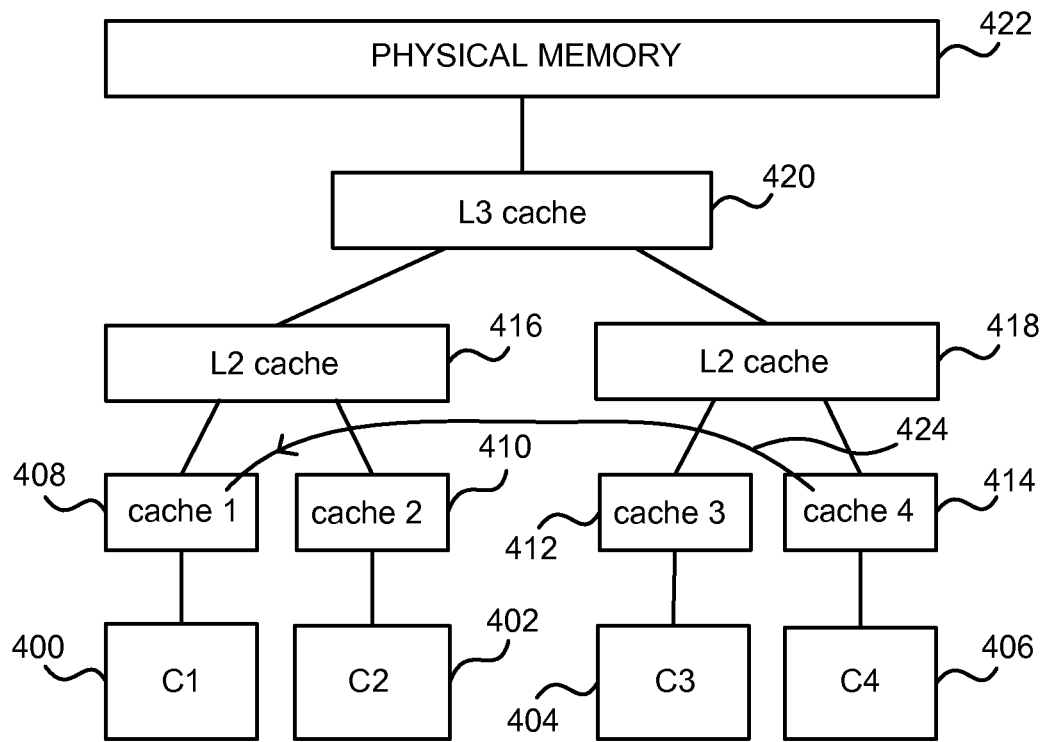
FIG. 4 is a schematic diagram of a multi-core computer with a hierarchical cache and shared physical memory.

FIG. 4 is a schematic diagram of a multi-core computer with a hierarchical cache and shared physical memory. In this example there are four cores 400, 402, 404, 406 although this is not essential and a hierarchical cache structure. Two or more cores may be provided. Each core has a level 1 cache. For example, core 1 400 has a level 1 cache 408, core 2 has a level 1 cache 410, core 3 has a level 1 cache 412 and core 4 has a level 1 cache 414. Two level 2 caches 416, 418 are provided; each level 2 cache is shared by two level 1 caches in this example. A level three cache 420 is also provided which is shared by the level 2 caches 416, 418. The level three cache 420 is in communication with physical memory 422. The hierarchical cache structure illustrated in FIG. 4 is an example only and other levels of cache structure may be used with different numbers of caches at each level and different arrangements of cache sharing. Each core is physically closest to its level 1 cache and this limits the physical size of the level 1 cache because of space requirements on the chip. Caches of higher level are further away from the cores and so may be physically larger. As distance away from the cores increases so does the time taken for communication between a cache and a core. The cores, caches, and memories are connected by an interconnect, and the interconnect is used to move data between them. Multi-core computers which use cache coherency mechanisms send data and metadata over the interconnect between branches of the hierarchical cache structure to provide up to date data to processes at the cores. Sending data and metadata across the interconnect of the hierarchical cache structure is time consuming, complex and resource intensive.

In an embodiment, no cache coherency mechanism is provided at the multi-core computer. For example, the core 4 406 in FIG. 4 may access a memory location whose value is present in cache 414, and core 1 may access the same memory location whose value is also present in cache 408. If core 4 writes to the memory location then, without cache coherency, core 1 cannot be confident of seeing the new value when it reads from its cache 408. By using a process to send a memory write request between cores as now described with reference to FIG. 5 up to date data is ensured without the need for cache coherency. For example, the arrow 424 in FIG.4 illustrates this process at a high level. If a process running at core 1 400 takes input from a process running at core 4 406 then core 4 may be configured to send a memory write request to the level 1 cache of core 1 400. This is illustrated by arrow 424. The memory write request is received at cache 1 408 and may be interpreted as a memory write received directly from core 1 400. In this way the data from the process running at core 4 is provided to core 1 in a simple and effective manner. The memory write request may be used to efficiently construct a message channel in a data structure at the shared physical memory. Performance benefits are achieved. For example, fast path message send operations are provided which operate with a single underlying message between the sending and destination cores. This reduces the overhead on individual communication. It also maintains locality within the implementation so that a sending core sending to a destination core does not involve some other core.

In another embodiment a cache coherency mechanism IS provided at the multi-core computer such as that illustrated in FIG. 4. In this case the same process to send a memory write request between cores may be used as described above. In this case the process of sending the memory write request enables the burden on the cache coherency mechanism to be reduced and this gives performance benefits.

The example described with reference to FIG. 4 uses a single shared physical memory. However, the process of sending the memory write request between cores, and the other processes described herein, are also applicable where architectures having more than one shared physical memory are used. For example, a non-uniform memory architecture (NUMA) with a memory per socket.

Figure 5:
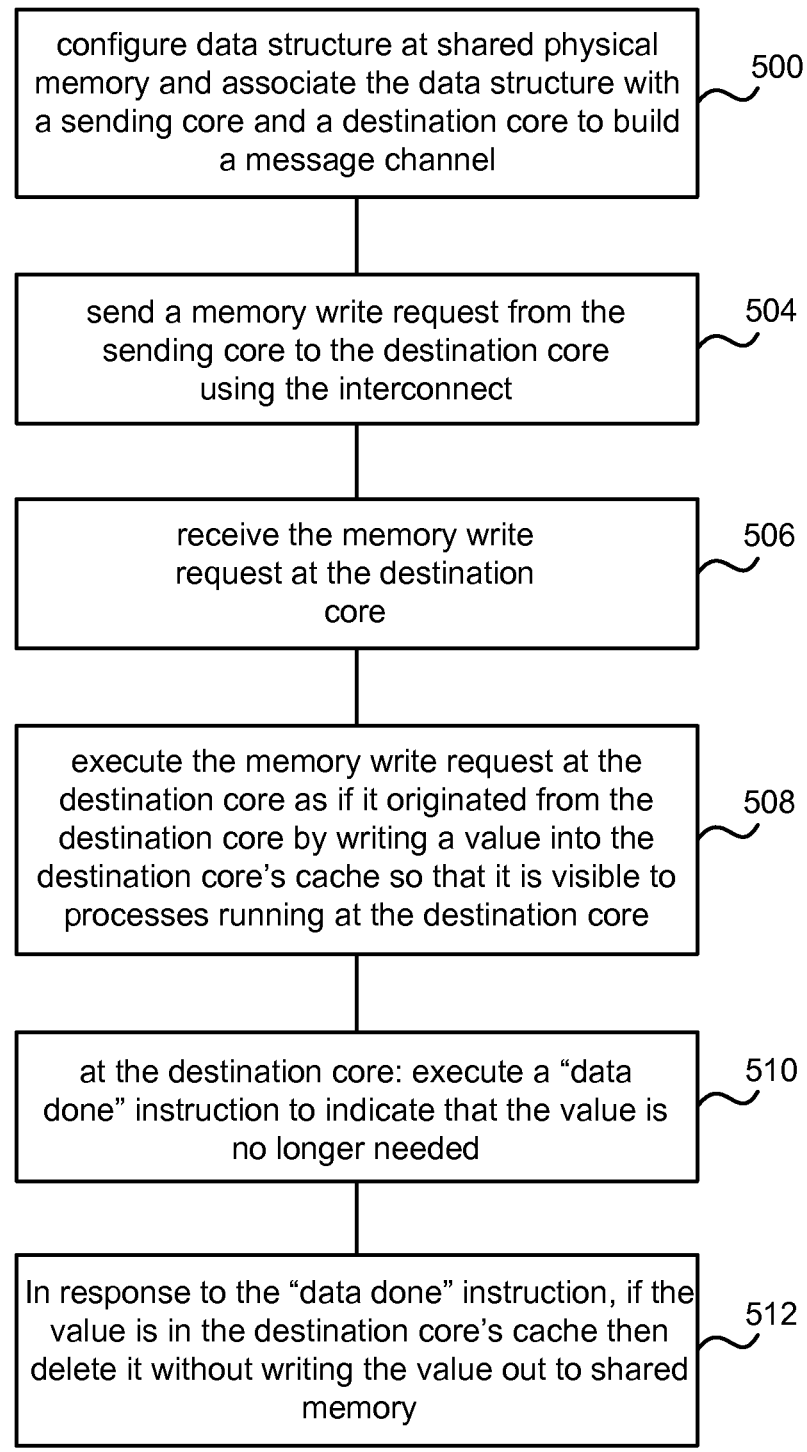
FIG. 5 is a flow diagram of a method of sending a memory write request between cores in a multi-core computer, receiving that instruction and executing it.

FIG. 5 is a flow diagram of a method of sending a memory write request between cores in a multi-core computer, receiving that instruction and executing it. This method includes steps at a sending core and also at a destination core.

A data structure is configured at a physical memory which is shared by two or more cores in a multi-core computer. The data structure is associated 500 with a sending core and a destination core (which are both cores in the multi-core computer). The data structure may be any convenient method for software to build a message channel between the sending and destination cores. More detail about this configuration process is given below with reference to FIG. 6.

A memory write request is sent 504 from the sending core to the destination core using the interconnect. In this way an update to the data structure may be sent as the memory write request from the sending core to the destination core. An example of functional steps that may be carried out at a sending core to implement sending of a memory write request is described below with reference to FIG. 7.

The memory write request is received 506 at the destination core. An example of functional steps that may be carried out to read a value previously updated at a destination core by a memory write request is described below with reference to FIG. 9.

The memory write request is executed 508 at the destination core as if it originated from the destination core. That is, the memory write request is executed from the destination core. Since it is written from the destination core the visibility of the update is coherent with respect to the destination core. In some examples, this is done by writing a value into the destination core's local cache (level 1 cache) so that it is visible to processes running at the destination core. Other examples are described later in this document with reference to FIG. 10.

Optionally, the destination core may indicate that it has finished processing a value that has been sent to it. In that case, the receiving core executes (510) a "data done" instruction to indicate that the value is no longer needed. The value may be deleted (512) from the receiving core's local cache without writing the value out to the shared physical memory.

Figure 6:
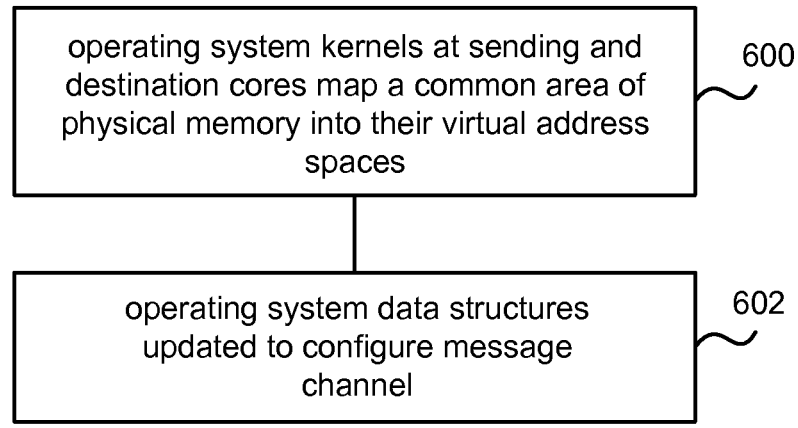
FIG. 6 is a flow diagram of more detail of a configuration process for use with the method of FIG. 5.

FIG. 6 gives more detail about the process of configuring the message channel. Operating system kernels at the sending and destination cores map a common area of physical memory into the address spaces of processes running on those cores. For example, when a message channel is to be used between two processes, then the common area of physical memory is mapped into the virtual address spaces of the processes. The common area of physical memory comprises the data structure that is formed as part of the method of FIG. 5. The data structure can take a variety of forms. For example, it may be a circular buffer, block of memory, vector, queue or heap or other data structure. Operating system data structures are then updated to configure the message channel, for example, to indicate that, at the sending core, any data written to the data structure is to be sent to the destination core. An operating system may also configure that for example at the sending core that the data structure may be written but not read and that, at the destination core, the data structure may be read but not written. Operations to send messages using the channel and to implement notification may then be carried out using unprivileged code, also referred to as user mode. In this way, common-case operations may be carried out in user mode. For example, this allows messages to be sent from user mode and delivered to a destination core without a kernel-mode interrupt on the destination core.

Many message channels may be established using the process of FIG. 6 and used to send memory write requests and notifications (as described below). In this way the process is effective for large numbers of communication channels. For example, to allow a system process to communicate with all other processes in the system.

Pseudo code operations are now described which provide functional examples of how the sending and receiving processes of FIG. 5 may be implemented. In practice an implementation may adapt existing instructions to perform these functions. For example, by adding prefixes before existing instructions, or marking particular pages of virtual or physical memory to indicate that operations on them should be performed in a way to implement the functionality described herein. Processor status flags may also be used to indicate that memory operations are to be performed to implement the functionality described herein.

An implementation may require that memory locations accessed by these pseudo-code operations are not accessed concurrently by ordinary memory reads and writes of other processes which may be ongoing at the multi-core processor. Such concurrent accesses may be considered a form of race condition.

Figure 7:
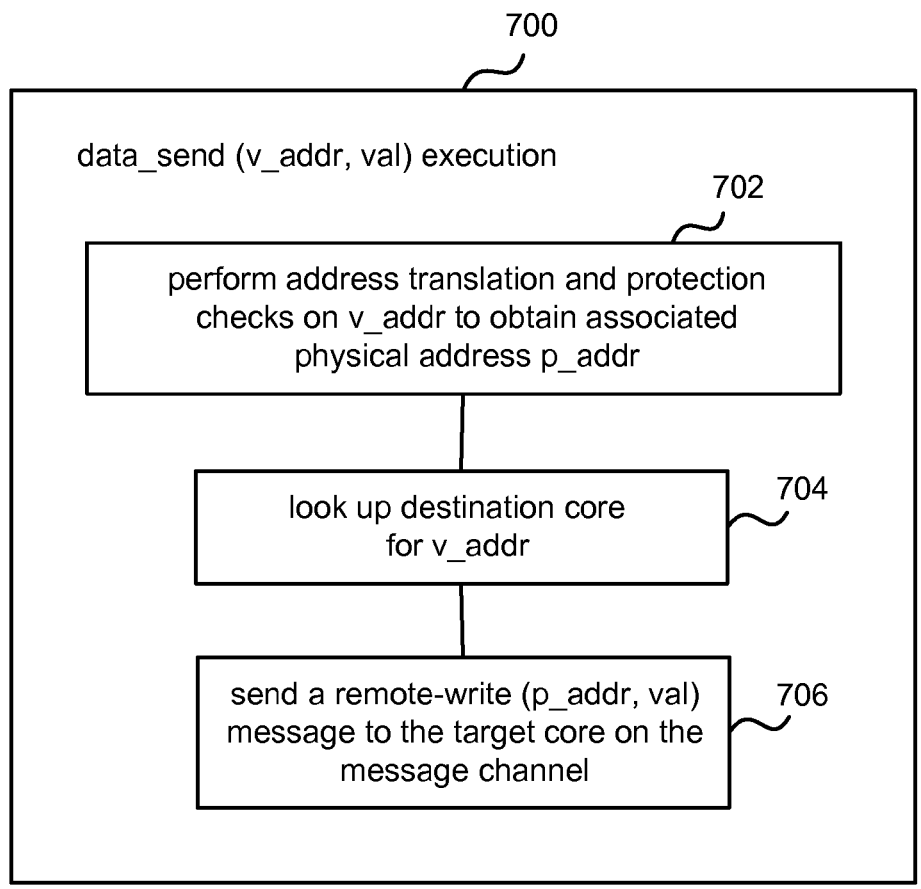
FIG. 7 is a flow diagram of a method of sending a memory write request.

A pseudo code data_send operation 700 is described with reference to FIG. 7. This may be used to implement the process of sending a memory write request from the sending core to the destination core (see step 504 of FIG. 5). This operation may take two arguments, v_addr and val. v_addr is the address for the representation of the data structure in the sending core's virtual memory and val is the value to be written by the memory write request.

A sending core may obtain "val" in various ways. Examples are now given: One implementation may take "val" from the contents of a set of processor registers. An alternative implementation may take "val" from the contents of memory accessible to the sending core such as the current contents of "v_addr" from the viewpoint of the sending core's cache. An implementation may impose constraints on v_addr and val, such as that v_addr must be aligned to the start of a cache line, or that the size of val must be a complete cache line, or the size of val and alignment of v_addr are such that no read-modify-write is required on a larger range of addresses in order to effect the write.

At a sending core a process may implement such a data_send operation by performing 702 address translation and protection checks on v_addr to obtain an associated physical address p_addr of the data structure in physical memory. This is achieved using a translation lookaside buffer. The sending core process looks up 704 the destination core for v_addr. More detail on this look up is given below with reference to FIG. 8. It then sends a remote_write (p_addr, val) message to the destination core on the message channel.

Figure 8:
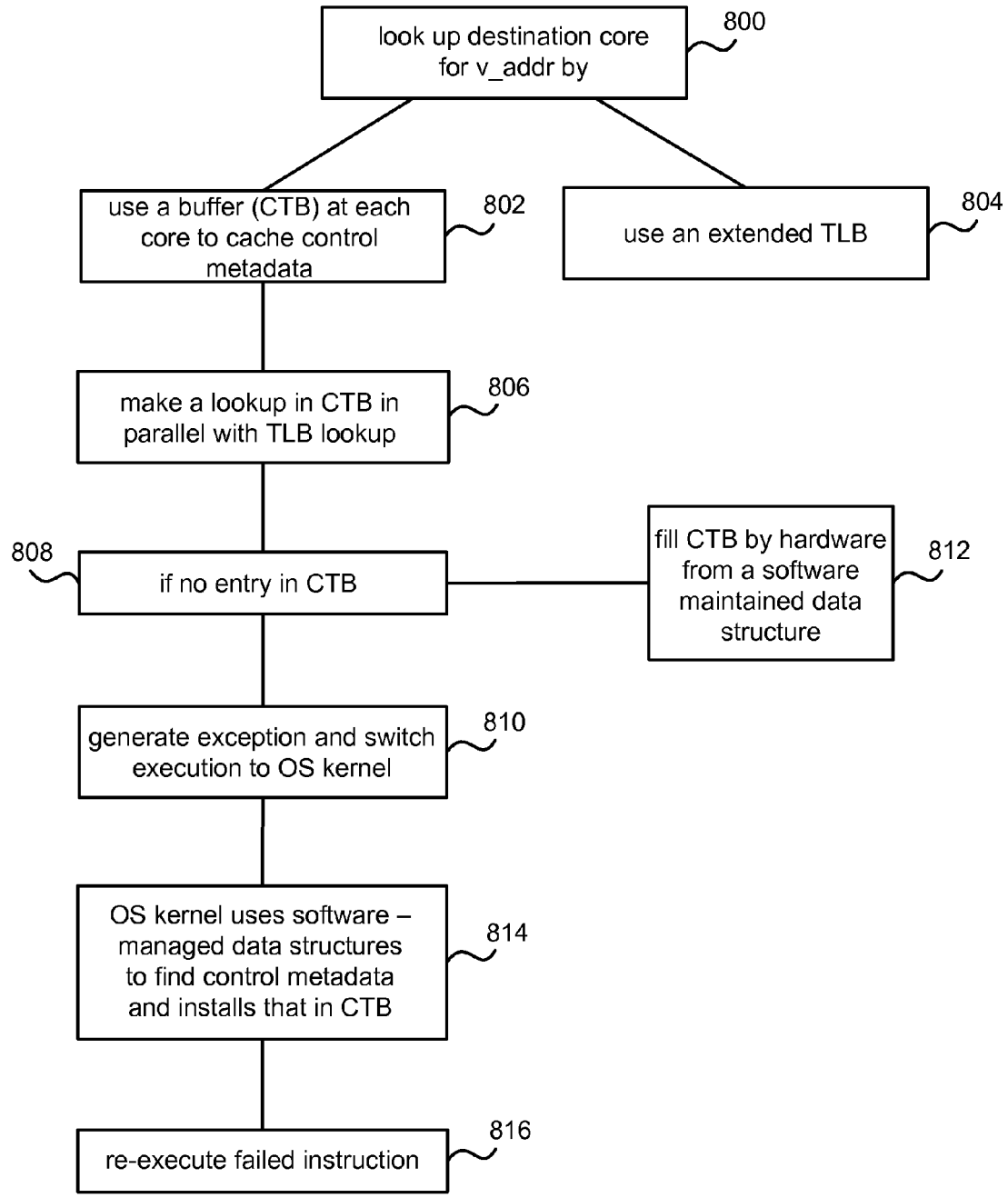
FIG. 8 is a flow diagram of a method of identifying a destination core.

The sending core process looks up 704 the destination core for v_addr (see box 800 of FIG. 8). This look up may be achieved in a variety of ways. In one example, a buffer is used 802 at each core to cache control metadata. This buffer may be referred to as a communication translation buffer (CTB). The control metadata may comprise an identifier for a destination core or destination cache. Alternatively, the control metadata may comprise an identifier for a destination software thread and a separate mechanism be used to translate the software thread identifier to an identifier for a destination core or destination cache (a thread translation buffer TTB is one way to perform this second mapping). A lookup in the CTB may be made in parallel 806 with translation lookaside buffer lookup. If no entry is found 808 in the CTB then an exception may be generated 810 and execution switched to the operating system kernel. The operating system kernel is then able to use software managed data structures to find appropriate control metadata and install that in the CTB. The failed instruction may then be re-executed 816. In another example, if no entry is found in the CTB 808 then the CTB may be filled by hardware 812 from a software maintained data structure. In another example, an extended translation lookaside buffer (extended TLB) is used 804. For example a TLB is extended to include control metadata. In this case steps 702 and 704 of FIG. 7 are integrated as part of TLB lookup.

By configuring the CTB and or TLB system software is able to control which processes can communicate. Protected inter-process communication is achieved meaning that messages can be sent between different processes, rather than only between threads operating in the same process. This enables processes to be used to implement system functions as in a multi-kernel or micro-kernel operating system.

Figure 9:
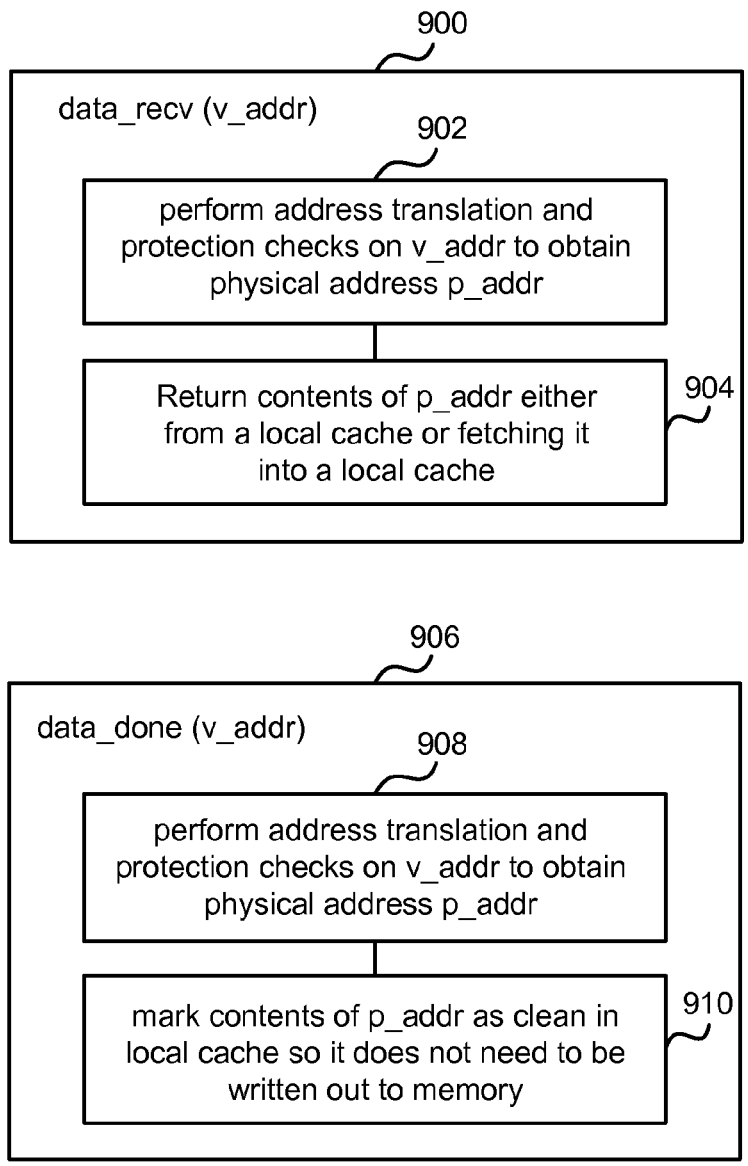
FIG. 9 is a flow diagram of a method of reading data previously updated by a memory write request and a method when data received from another core is no longer needed.

A pseudo code data_receive operation 900 is described with reference to FIG. 9. This may be used to implement the process of reading data previously updated by a memory write request at the destination core (see steps 506 and 508 of FIG. 5). The data_receive operation 900 takes one argument v_addr which is the address for the representation of the data structure in the receiving core's virtual address space. The process at the destination core performs address translation and protection checks 902 on v_addr to obtain the physical address p_addr of the data structure in shared memory which implements the message channel. The process returns 904 the contents of p_addr either from a local cache or fetching it into a local cache.

A pseudo code data_done operation 906 is described with reference to FIG. 9. This may be used to implement the process of signaling that data is no longer needed by a process (see steps 510 and 512 of FIG. 5). Data_done takes one argument v_addr. Address and translation checks 908 are performed on v_addr to obtain the physical address p_addr. The contents of p_addr are marked as clean in the local cache of the destination core. The contents of p_addr do not then need to be written out to memory.

Figure 10:
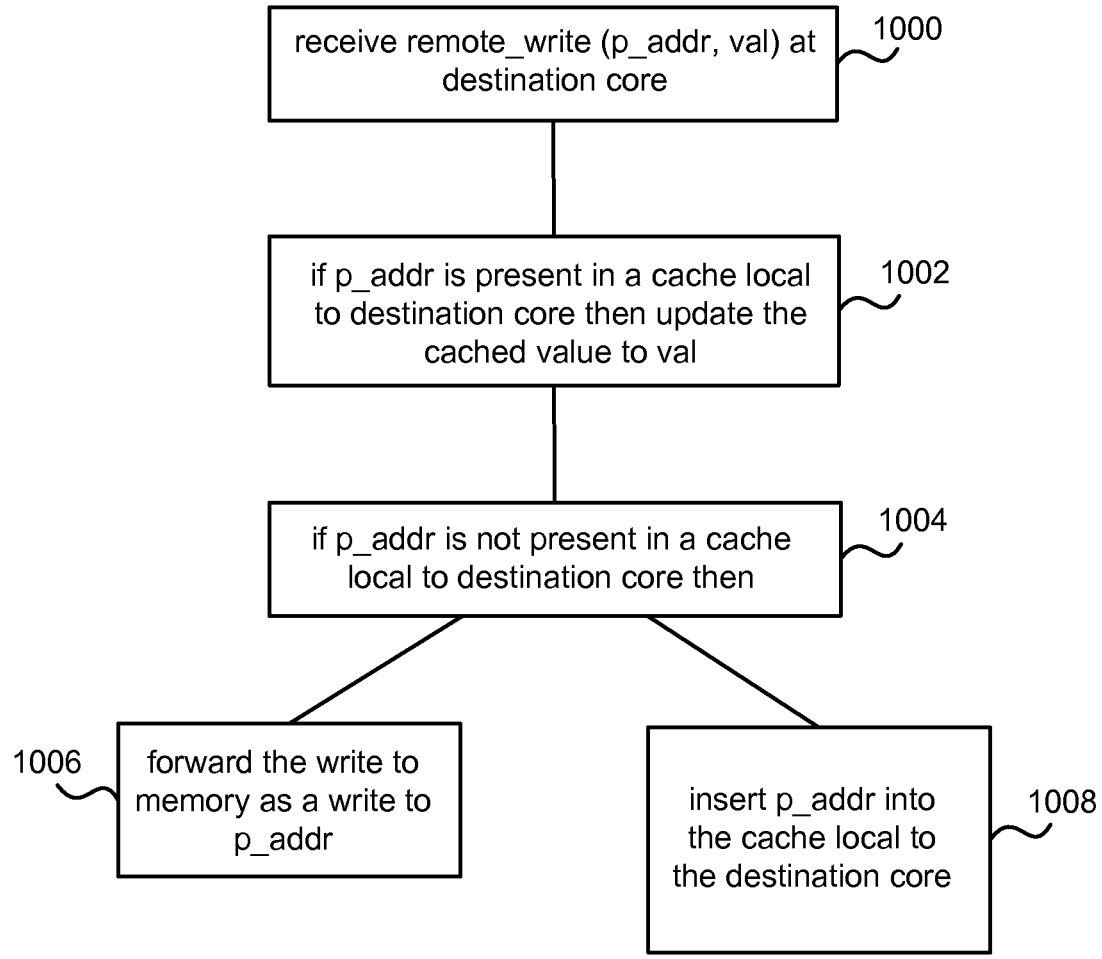
FIG. 10 is a flow diagram of a method of receiving a memory write request from a remote core.

A pseudo code remote_write operation 1000 is described with reference to FIG. 10. This may be used to implement the process at the destination core of executing the memory write request (see step 508 of FIG. 5). Remote_write takes two arguments, p_addr and the value to be written by the received memory write request. If p_addr is present in a cache local to the destination core then the cached value is updated to val 1002. If p_addr is not present in a cache local to the destination core 1004 then either: forward 1006 the write to the next level of the cache memory hierarchy as a write to p_addr; or allocate 1008 space in the cache local to the destination core, possibly by evicting some other line, thereby inserting p_addr into the cache local to the destination core. An implementation requires a policy to select between these two alternatives; selecting between them involves a trade-off between consuming cache space on the destination core as data arrives (without knowing whether or not the data will be read before being evicted from the cache), versus incurring cache misses on the destination core (if data is not stored in the cache, but is subsequently accessed). Two examples of policies are now given. A "forward by default" policy is to update a cached entry if it is present and, otherwise, to forward the update to memory. Software can use a conventional pre-fetch or read instruction to bring location(s) into the cache if it expects them to be the target of remote_write requests. A "buffer by default" policy is to buffer an update in the cache if the destination thread is currently running, and to forward the update to memory if the destination thread is not running. This entails (i) adding a destination-thread-ID to the contents of the remote_write requests, and (ii) adding a current-thread-ID status register to the core. A variant of "buffer by default" is to limit the cache space used by remote_write requests to a subset of the cache; for example, in a 4-way set associate cache, remote_write requests may be restricted to writing unbuffered data into 1 of the ways.

A notification process which uses a data-structure in the shared memory established as in FIG. 5 is now described. The notification may be used for a variety of different purposes, for example, to indicate that it is time to perform a garbage collection, or that it is time for a process to exit, or that a given message channel requires attention. In another example, a notification may be used to wake up a sleeping core or to power down a core as part of an energy conservation process. This notification process may be used in conjunction with the process of sending memory write requests to remote cores described herein and so may be referred to as a "remote notification" process. Memory regions used for notification are distinguished from ordinary memory and from message-passing memory regions. The same techniques used to implement the message channel are used for delivering notifications, sending a "remote_notify" request instead of a "remote_write" request.

A notification data structure is configured at a shared physical memory of a multi-core computer. Each core to participate in a notification scheme is informed 1100 of the notification data structure. This is achieved in a configuration phase in a manner similar to that described above with reference to FIG. 6. In an example, the notification data structure holds a shared bit-vector with each bit used to indicate a different condition. A cache-line-sized vector may be sufficient; a hierarchy can be built using multiple vectors if more bits are needed. Other types of data structure may also be used. A dedicated notification cache may be used at each core to hold the contents of the notification data structure (instead of using a normal data cache entry). This may be done to avoid modification to the performance-critical data cache but is not essential.

At a sending core information is obtained 1102 about which of a set of events has occurred. This information is condensed into a compact, low level representation. For example, the information may comprise a list of message channels on which messages have been sent and the compact, low level representation may comprise a bit vector with each bit associated with a set of message channels.

A notification white list is optionally checked 1104 by the sending core. This enables a protected notification scheme to be implemented which is described in more detail later. In one implementation the notification white list comprises a series of (addr,val) pairs, each indicating that it is valid for the core to perform a notification to address "addr" so long as the value carried in the remote_notify request contains only bits that are set in "val".

The sending core sends 1106 a memory notify request from the sending core to a destination core using a message channel established as described with reference to FIG. 5. The memory notify request is to write a value which represents which of the set of events has occurred. The memory notify request is received at the destination core 1108 and executed 1110 as if it originated from the destination core and so as to update the notification data structure by a logical OR operation. The logical OR operation is between the value specified by the memory notify request and existing values in the notification data structure. This updates the notification data structure with information about which events occurred. If the address of the notification data structure is cached at the destination core then the update 1112 occurs at the cache. Other logical operations may also be used, including but not limited to logical AND, XOR.

If the address of the notification data structure is not cached at the destination core then the update is forwarded 1114 to memory. Note that a memory notify request is treated differently from a memory write request. This is because a memory notify request requires the value carried in the request ("val") to be combined with the existing contents of memory using a logical OR operation, rather than simply being forwarded to memory without processing. Various mechanisms are possible for performing this work. Two examples are given. First, a core may replace "val" with a binary value in which all bits are set to 1. This value can be forwarded to memory in place of "val". This can cause spurious notifications to be signaled, but does not cause a genuine notification to be missed. Second, a core may include a notification processing unit that is responsible for combining "val" with the existing contents of memory. The notification processing unit accesses the memory system of the machine, reads the current value from memory, combines it with "val", and writes the resulting value.

In this example, a sending core is able to notify a destination core as to which of a set of events has occurred. This is achieved by updating a notification data structure which the destination core is able to watch. If the destination core is busy and does not watch the notification data structure it may miss an event. In another embodiment the destination core is nudged or actively forced to call a notification function when a notification is received.

In order to implement the "nudge" notification scheme notification registers may be used at the destination core. In an example, four notification registers are provided. These are configured 1200 to hold a watch flag, a mask, a watched area, and a notification target function. The mask indicates whether or not the notification mechanism should perform "nudge" operations. The mask and watched area indicate which specific notifications should cause a "nudge" to occur. The notification target function is any function which is to be actively called in order to nudge the destination core when an event occurs.

Figure 12:
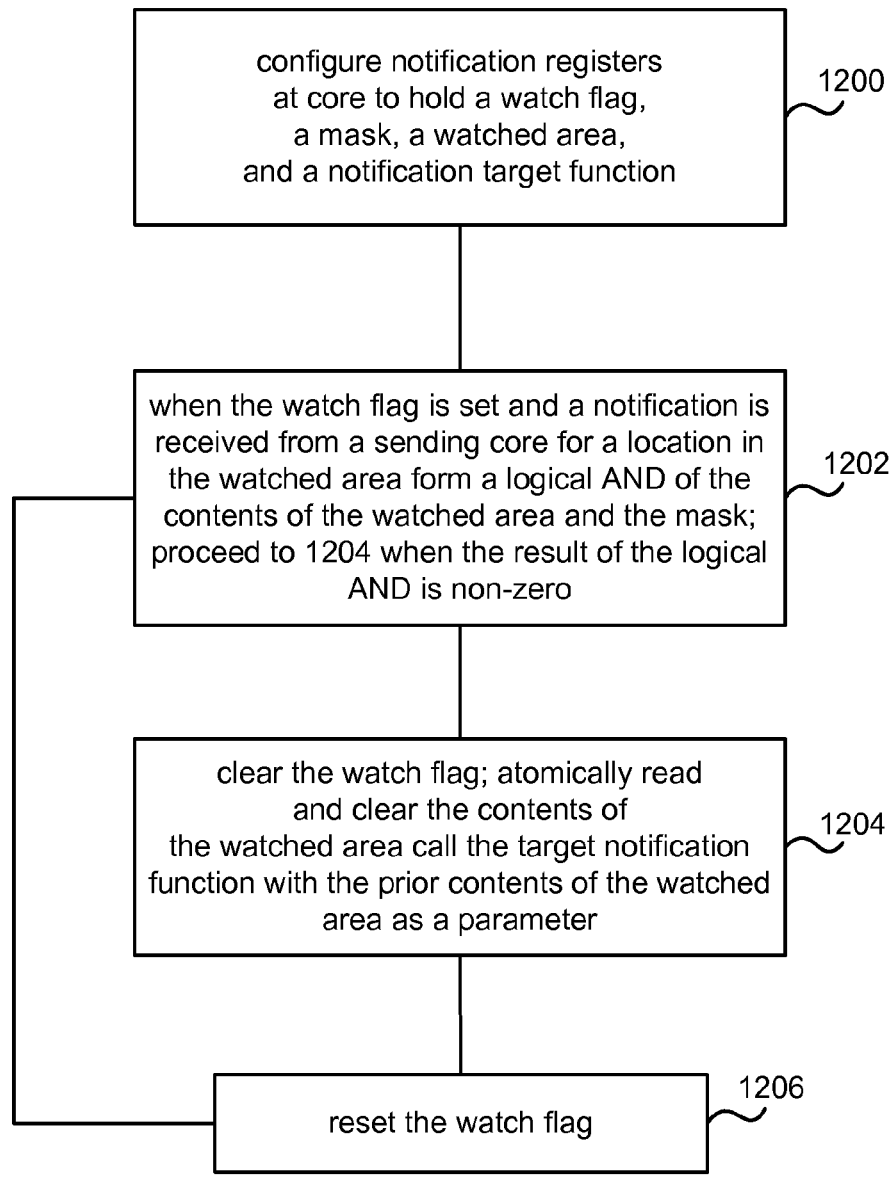
FIG. 12 is a flow diagram of a process at a receiving core for implementing a notification process with nudging.

With reference to FIG. 12 when a notification is received 1202 from a sending core the destination core examines its watch flag. If the flag is set, and if the destination address for the notification is in the watched area, and if the logical AND of the value of the notification and the mask is non-zero, then a nudge is performed. To perform a nudge, a core clears the watch flag 1204, atomically reads and clears the contents of the watched area and calls the target notification function with the prior contents of the watched area as a parameter. The watch flag is then reset 1206 and the process returns to waiting for a notification 1202.

A thread at the destination core may be interacting with many different senders of messages, and by using the remote notification process it is possible to avoid requiring the destination core thread to poll a large number of message channels. Each polling operation will either require an access to main memory, or a local cache line which holds the head of the message channel.

The notification process may also be implemented on cache-coherent hardware. In this case the watched address is one or more memory locations and coherence messages are used to trigger notifications. The destination core holds a line containing the watched area in shared or exclusive mode. When it loses the line then it fetches it again after a back-off delay and evaluates whether or not it needs to deliver a notification. (This may be done either by extending the normal cache, or as a separate special-case single-entry cache). In summary, a cache coherency mechanism may be used to interconnect the plurality of cores in some embodiments. At the destination core, when a cache coherency invalidation is noticed for the notification data structure a fetch may be sent from the destination core for the notification data structure.

As mentioned above a notification white list may optionally be used to implement a notification scheme with protection by which a sender is able to set only a specific set of bits within specific locations. This may be used where the sender and destination are separate processes (rather than threads within the same process), or where multiple distinct sender processes are used to send notifications to the same destination process. In both of these cases, it is possible to prevent a sender from being able to set notifications arbitrarily. For example, the operating system arranges that the sender maps the notification address (address of the notification data structure) without user-mode access. Each core holds a new "notification white list" (NWL) comprising soft-state associated with the sender that lists (address, mask) pairs that this sender is permitted to send to. The white list is initially empty, and is cleared on thread switch. On a notify_send operation, the NWL is searched for the target address, and the notification value is compared with the allowable mask. If there is a miss, or if the value being notified is not contained within the allowable mask, then an exception occurs on the sender.

As with the CTB, the operating system on the sender determines whether or not the notification is allowed and, if so, adds an entry to the NWL. In this way the CTB and NWL are kept separate because the CTB deals with aggregate regions such as pages, whereas the NWL deals with individual addresses. Common instructions may be provided to clear both of them as a single step.

In another embodiment, the NWL is implemented by the operating system storing the permitted notification bits in memory which is read-only to the notification sender, and the CTB or extended-TLB stores for that page the destination core and physical address of the notification memory (aside from the physical address of the NWL memory). When the sending core attempts to write a notification to the page the corresponding NWL cache line is first fetched, a logical AND operation is performed, and the resulting notification bits then travel as a remote_notify_request to the destination core.

Optionally, an implementation may place virtual addresses in remote_write and remote_notify requests alongside or in place of physical addresses. In a "receiver translated" implementation the remote_write and remote_notify requests carry only a virtual address. Translation and protection checks are performed at the destination core prior to the remote_write process (1002) or remote_notify process (1110). Such an implementation may omit address translation and protection checks in the data_send and notify_send operations. Such an implementation may constrain remote_write and remote_notify operations to occur only between processes with the same virtual memory mapping for the shared data structure.

Optionally, the destination core may indicate to the sending core that it has completed processing a request such as a remote_write request or a remote_notify request. A destination core C1 may send a response message to a sending core C2. On receiving the response message core C2 can be certain that the memory updates specified in the request message are visible to processes running at core C1. In one embodiment, a response is sent automatically to all requests.

In another embodiment, core C2 indicates whether or not a response is required. Core C2 may use responses to provide ordering between a series of remote_write and remote_notify_requests by requiring a response to an earlier request before issuing a subsequent request. Core C2 may also use responses to provide ordering between remote_write and remote_notify requests and other processes via a remote_fence operation (described below).

The remote write process and remote notify processes described herein may be integrated with operating system functions such as scheduling of threads, pre-emption of threads, migration of threads within the machine, and so on. This is beneficial in a multi-programmed machine in which a core may be multiplexed between several processes over time. More detail about this is now given.

Pre-emption or Migration of Sender T1

Upon pre-emption of T1 processes clear the CTB and NWL before switching to a thread in a different protection domain. The CTB and NWL hold soft-state that may be rebuilt next time T1 runs.

Upon migration, it is possible to ensure that messages are not re-ordered. For example, suppose that T1 migrates from core C-Old to C-New, and that T1 is communicating with T2 on core C2. The implementation may provide that T2 does not handle messages received from T1 on C-New before finishing with messages received from T1 on C-Old. In an example implementation it may be sufficient to defer rescheduling the thread on a different core until an implementation-specific delay has elapsed (e.g., the product of the maximum number of messages that may be buffered within the implementation and the maximum time that may be required to handle each message). This bound may be acceptable because the handling of memory_write request and memory_notify_request messages does not involve the execution of software handlers. This delay may be exposed to software via a new "remote_fence" operation that either (i) delays until all messages will be guaranteed to be handled, or (ii) communicates with each remote core in the caller's CTB and receives a response when the remote core has completed handling all messages from the sender. In an alternative implementation a "remote_fence" operation is implemented using response messages: the "remote_fence" operation delays until responses have been received from all requests that have been sent.

Pre-emption or Migration of Receiver T2

Note that no special work is required upon pre-emption of T2; remote_write and remote_notify messages may continue to arrive and to be handled by the core that last ran T2 (updating main memory rather than the cache). This is particularly likely to happen when T2 has blocked waiting for data from T1, and so it may be desirable to allow this forwarding to continue for some time in expectation that T2 will be resumed on the same core (rather than informing the core running T1 that T2 has now been pre-empted).

If T2 is migrated from C-Old to C-New then it is possible to arrange that messages are not lost. Messages might be lost if they are forwarded to main memory from C-Old, while C-New has a non-coherent copy of the same location in a local cache. Consequently, the receiver may arrange that any senders are aware of the receiver's new location. Two alternative implementations depending on whether or not a TTB (thread translation buffer) is used are now described.

Migration without TTB: This problem is analogous to changing a virtual-to-physical page translation (in effect, the CTB caches information about thread locations, in the same way that a TLB caches information about virtual pages' locations in physical memory). Similar approaches to TLB shoot-down can be used to support thread migration. Before resuming the receiver T2 on C-New, the operating system carries out the following process:

It identifies the set of cores that might be running threads that are senders to T2 (e.g., from information maintained for use by the CTB miss handler, or from the data structures maintained when setting up shared memory between T1 and T2).

It sends an inter-processor interrupt (IPI) to these cores.

The IPI handler flushes the CTB entries for pages shared with T2, and executes a "remote_fence" to ensure that messages sent just before the IPI are received before any messages sent after the IPI.

Migration with TTB: The TTB provides a level of indirection between thread IDs (e.g. T2) and core IDs (e.g. C-New), and so migration entails changes to the mapping in the TTB rather than in the CTB entries. Alternative TTB implementations may provide hardware coherence between TTBs.

In an alternative implementation the TLB, CTB or TTB update required at a sending core may be performed by associating the TLB, CTB or TTB with the address of an operating system configuration data structure in memory of which the TLB, CTB, or TTB is a cache, and sending a remote_write_request for that configuration data structure to the sending core from the core which is performing the migration. The TLB, CTB or TTB will therefore be updated in a way which is immediately visible to the sending core without needing to send it an interrupt.

Changes to Memory Configuration at Sender T1

An operating system may reconfigure memory at sender T1 so that the sender no longer has write access to a physical page. For example, the operating system may remove write permission for T1 to the physical page or it may change a virtual-to-physical address translation so that a given virtual page maps to a different physical page. Before completing such a reconfiguration an operating system may use a "remote_fence" to ensure that writes previously issued by sender T1 have completed before the reconfiguration occurs.

Scheduling of Threads

In a multiprogrammed system it is useful for the operating system running on one core to know when a given thread assigned to the core becomes runnable. An extension to the notification mechanism can be used to provide this information by allowing a notification sent to T2 to implicitly signal to the operating system that T2 is ready to run.

With this extension, each core has a kernel-mode notification mechanism in addition to the user-mode mechanism described above. In addition, each thread has an operating system-assigned thread ID, and this ID is included in "remote_notify" messages emitted to the thread. If a "remote_notify" message arrives for a thread other than the one that is currently running, then a kernel-mode notification occurs. This occurs as if on a bit position indexed by the target thread ID, relative to an address provided by the operating system on the target core. (e.g., the operating system may indicate that kernel-mode notifications should be delivered at address 0xf0000000, and a notification to thread ID 256 would be indicated by setting a bit at address 0xf0000020). As with user-mode notification, the resulting value is compared with a mask; if the logical-AND of the value and the mask is non-zero, then a notification is delivered. Kernel-mode notifications are delivered via an interrupt, typically causing the operating system to reschedule the thread being notified (either immediately, or at some later time).

Note that the use of a bitmap and mask allows the kernel to elect not to receive notifications for a given thread (e.g., because it has already been notified), and allows multiple notifications to accumulate in hardware (e.g., if further notifications arrive while handling a given notification).

The processes described herein may also be arranged to allow efficient integration of message passing with scheduling. For example, by allowing kernel-mode schedulers to identify when a receiving process has a message available to it and allowing user mode software to identify which of various message channels has a message available (or conversely has space available for a new message to be sent on it).

The remote write process and remote notify processes described herein may provide all of, or one or more of: execution of common-case operations in user-mode, protected inter-process communication, integration with operating system functions, ability for fast-path message send operations, operation for large numbers of communication channels and efficient integration of message passing with scheduling. However, it is not essential for the processes described herein to provide all these functionalities.

The remote write process and remote notify processes described herein may provide protected inter-process communication meaning that messages may be sent between different processes, rather than only between threads operating in the same process. This is beneficial, for example, when processes are used to implement system functions as in a multi-kernel or micro-kernel operating system. System software may control which processes can communicate.

The remote write process and remote notify processes described herein may provide integration with operating system functions. For example, by allowing messages to be sent to a receiver that has been pre-empted, and allowing a thread to be migrated between cores in a machine, or for the whole machine to be suspended/resumed for power management. This may be beneficial in a multi-programmed machine in which a core may be multiplexed between several processes over time.

The remote write process and remote notify processes described herein may provide effective functionality for large numbers of communication channels. For example, to allow a system process to communicate with all other processes in the system. (A message channel is backed by storage in physical memory which is relatively plentiful in a machine, rather than being backed by space within a dedicated message passing buffer memory which may be scarce).

Figure 13:
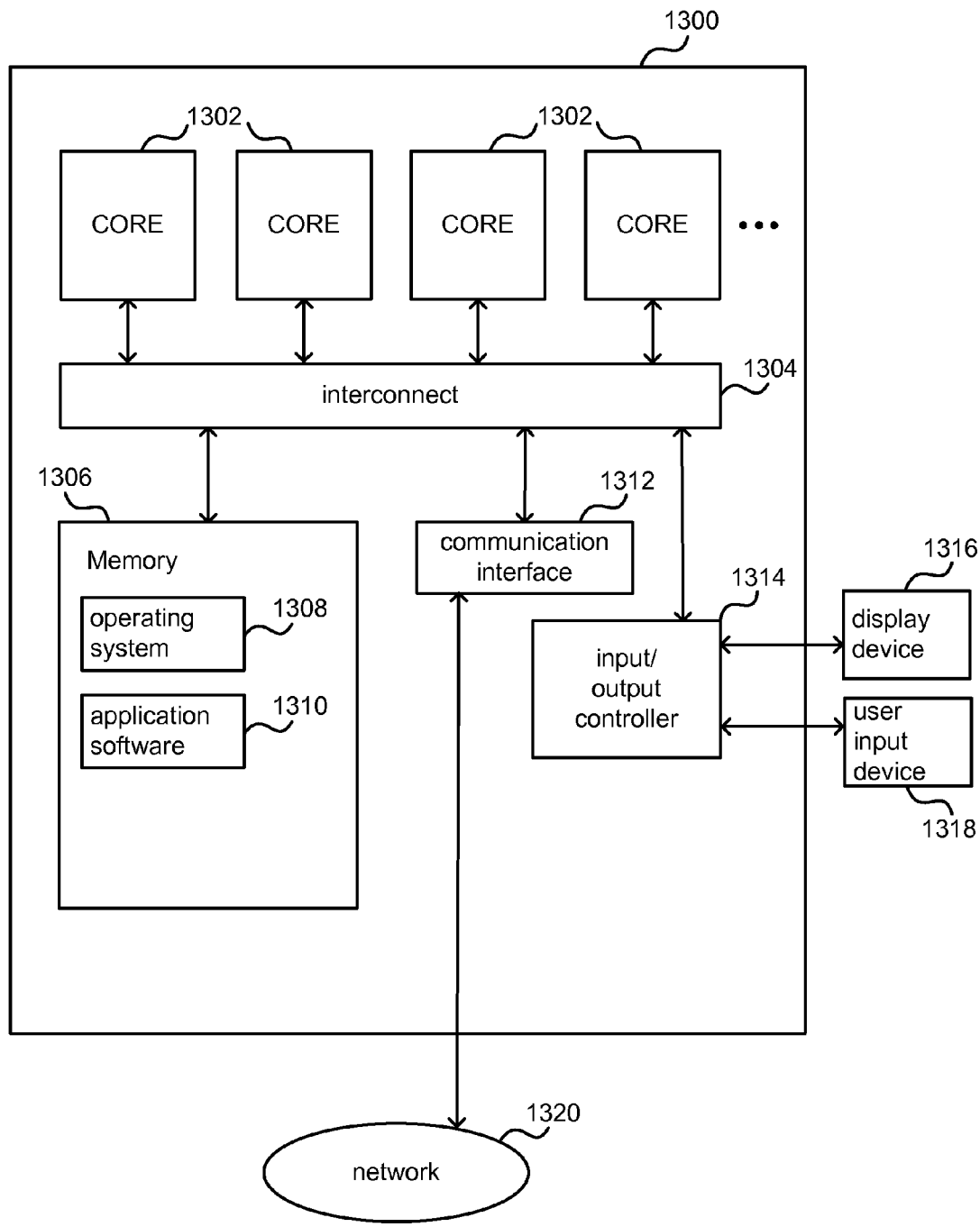
FIG. 13 illustrates an exemplary multi-core computing-based device in which embodiments of the remote memory writing and notification processes described herein may be implemented.

FIG. 13 illustrates various components of an exemplary multi-core computing-based device 1300 which may be implemented as any form of a computing and/or electronic device, and in which embodiments of the remote write and remote notification processes described herein may be implemented.

Computing-based device 1300 also comprises one or more processing cores 1302 which may be microprocessors, controllers or any other suitable type of processors for processing computing executable instructions for general purpose computing and also for implementing the remote write and remote notification processes described herein. The cores 1302 may be of different types such as a mixture of graphics processors and general purpose processors or may be of the same type. For example, the cores may be as described above with reference to FIGS. 2 or 3. In some examples, for example where a system on a chip architecture is used, the processors 1302 may include one or more fixed function blocks (also referred to as special-purpose cores) which implement a part of the methods described herein in hardware (rather than software or firmware) Platform software comprising an operating system 1308 or any other suitable platform software may be provided at the computing-based device to enable application software 1310 to be executed on the device.

The cores 1302 are in communication with an interconnect 1304. The cores 1302 share a physical memory 1306 via the interconnect 1304.

The computer executable instructions may be provided using any computer-readable media that is accessible by computing based device 1300. Computer-readable media may include, for example, computer storage media such as memory 1306 and communications media. Computer storage media, such as memory 1306, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory, phase change memory, memristors or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 1306) is shown within the computing-based device 1300 it will be appreciated that the storage may be distributed or located remotely and accessed via a network or other communication link (e.g. using communication interface 1320)

The computing-based device 1300 also comprises an input/output controller 1314 arranged to output display information to a display device 1316 which may be separate from or integral to the computing-based device 1300. The display information may provide a graphical user interface. The input/output controller 1314 is also arranged to receive and process input from one or more devices, such as a user input device 1318 (e.g. a mouse or a keyboard). This user input may be used to set configuration parameters and to use the computer for general purpose computing. In an embodiment the display device 1316 may also act as the user input device 1318 if it is a touch sensitive display device. The input/output controller 1314 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method at a multi-core processor having a plurality of cores and at least one shared physical memory, the method comprising:
   sending an update to a portion of the shared physical memory as a memory write request from a first one of the cores, being a sending core, to a destination core;
   receiving the memory write request at the destination core;
   executing the memory write request into a cache memory hierarchy at the destination core as if it originated from the destination core.

2. A method as claimed in claim 1 comprising: creating a data structure in the shared physical memory, written by at least the sending core and read by a single core being the destination core.

3. A method as claimed in claim 2 comprising using operating system kernels at the sending and destination cores to map a common area of physical memory for the data structure into virtual address spaces local to each of the sending and destination cores; and updating operating system data structures to configure that a write to the virtual address on a sending core is implemented by the memory write request to the destination core.

4. A method as claimed in claim 1 wherein the destination core is identified by the sending core using control metadata established during a configuration process and cached at the sending core using a buffer which is selected from any of: a translation lookaside buffer extended to incorporate the control metadata; and a dedicated communication translation buffer which stores the control metadata.

5. A method as claimed in claim 1 wherein the plurality of cores are interconnected using a hierarchical cache structure without a cache coherency mechanism.

6. A method as claimed in claim 1 wherein the plurality of cores are interconnected using a hierarchical cache structure with a cache coherency mechanism.

7. A method as claimed in claim 1 comprising executing a request at the destination core indicating that a value written by the memory write request is no longer needed and clearing that value from a cache of the destination core before that value is written to the shared memory.

8. A method as claimed in claim 1 wherein executing the memory write request into a cache memory hierarchy at the destination core is carried out so that a value written by the memory write request into the cache memory hierarchy at the destination core is visible to processes running at the destination core.

9. A method at a multi-core processor having a plurality of cores which share at least one physical memory the method comprising:
   configuring a notification data structure at the shared physical memory and establishing a representation of that notification data structure at a virtual address space of each of the plurality of cores, each virtual address space being a mapping of at least part of the shared physical memory at a core;
   at a sending core, being one of the cores, obtaining information about which of a set of events has occurred;
   notifying a destination core of the information, the destination core being one of the plurality of cores, by:
   updating the notification data structure or the representation of that notification data structure at the destination core virtual address space; and at least one of:
  updating the notification data structure or the representation of that notification data structure at the destination core virtual address space by sending a memory notify request from the sending core to the destination core to write a value which represents which of the set of events has occurred at the destination core, as if that notification data structure update originated from the destination core;
  updating the notification data structure or the representation of that notification data structure at the destination core virtual address space by sending a memory notify request from the sending core to the destination core to write a value which represents which of the set of events has occurred at the destination core, as if that notification data structure update originated from the destination core, the updating further comprising using an OR operation;
  information about which of a set of events has occurred comprises information about message channels and the notification data structure comprising a bit vector wherein each bit of the bit vector is associated with one or more of the message channels;
  updating the notification data structure or the representation of that notification data structure at the destination core virtual address space by sending a memory notify request from the sending core to the destination core to write a value which represents which of the set of events has occurred at the destination core, as if that notification data structure update originated from the destination core, wherein the sending core is only allowed to send the memory notify request to the destination core under specified conditions;
  updating the notification data structure or the representation of that notification data structure at the destination core virtual address space by sending a memory notify request from the sending core to the destination core to write a value which represents which of the set of events has occurred at the destination core, as if that notification data structure update originated from the destination core, and providing a notification white list at each core comprising address mask pairs and only allowing the sending core to send the memory notify request to the destination core if the address of the destination core and the value to be written by the memory notify request are present in the notification white list as an address mask pair; or
  using a cache coherency mechanism to interconnect the plurality of cores; and at the destination core, noticing a cache coherency invalidation for the notification data structure and sending a fetch from the destination core to the shared memory for the notification data structure.

10. A method as claimed in claim 9 comprising updating the notification data structure or the representation of that notification data structure at the destination core virtual address space by sending a memory notify request from the sending core to the destination core to write a value which represents which of the set of events has occurred at the destination core, as if that notification data structure update originated from the destination core.

11. A method as claimed in claim 10 which further comprises using a logical OR operation to carry out the update.

12. A method as claimed in claim 10 which further comprises only allowing the sending core to send the memory notify request to the destination core under specified conditions.

13. A method as claimed in claim 10 which further comprises providing a notification white list at each core comprising address mask pairs and only allowing the sending core to send the memory notify request to the destination core if the address of the destination core and the value to be written by the memory notify request are present in the notification white list as an address mask pair.

14. A method as claimed in claim 9 wherein the notification data structure comprises a bit vector.

15. A method as claimed in claim 14 wherein information about which of a set of events has occurred comprises information about message channels and wherein each bit of the bit vector is associated with one or more of the message channels.

16. A method as claimed in claim 9 wherein notifying the destination core causes the destination core to call a notification function.

17. A method as claimed in claim 16 comprising using at least four notification control registers at each core, one to hold a watch flag, one to hold a mask representing information about which of the plurality of events has occurred, one to hold a watched area being the virtual address space of the notification data structure, and one to hold a notification target function.

18. A method as claimed in claim 9 comprising: using a cache coherency mechanism to interconnect the plurality of cores; and at the destination core, noticing a cache coherency invalidation for the notification data structure and sending a fetch from the destination core to the shared memory for the notification data structure.

19. A multi-core processor comprising:
  a plurality of cores interconnected using a hierarchical cache structure;
  at least one shared physical memory, arranged to communicate with the plurality of cores using the hierarchical cache structure;
  a data structure at the shared physical memory;
  one of the cores being a sending core, arranged to send a memory write request to a destination core, being one of the cores, to update the data structure at the shared physical memory which is mapped into virtual address spaces at parts of the cache structure local to each of the sending and destination cores;
  the destination core being arranged to receive the memory write request and to execute the memory write request as if it originated from the destination core and so that a value written by the memory write request is stored in the virtual address space of the destination core in such a manner that it is visible to processes running at the destination core.

20. A multi-core processor as claimed in claim 19 wherein each core comprises a buffer arranged to store control metadata for enabling a sending core to identify a destination core and where the buffer is any of an extended translation lookaside buffer and a communications translation buffer holding only control metadata for enabling a sending core to identify a destination core.

* * * * *